United States Patent [19]
Pufpaff

[11] Patent Number: 5,560,695
[45] Date of Patent: Oct. 1, 1996

[54] VENTING DEVICE

[75] Inventor: Frederick J. Pufpaff, Loudonville, N.Y.

[73] Assignee: Southco, Inc., Concordville, Pa.

[21] Appl. No.: 749,847

[22] Filed: Aug. 26, 1991

[51] Int. Cl.$^6$ .................................................. A47B 96/04
[52] U.S. Cl. ........................................... 312/406; 312/401
[58] Field of Search .................................. 312/401, 406, 312/406.1, 407.1, 408

[56] References Cited

U.S. PATENT DOCUMENTS

| | | |
|---|---|---|
| 3,132,382 | 5/1964 | Magester . |
| 3,156,019 | 11/1964 | Dawley . |
| 4,067,096 | 6/1978 | Kochendorfer ................... 312/406 |
| 4,107,833 | 8/1978 | Knight et al. . |
| 4,151,681 | 5/1979 | Roberts . |
| 4,180,297 | 12/1979 | Abrams . |
| 4,735,468 | 4/1988 | Taylor et al. ..................... 312/408 |
| 4,946,363 | 8/1990 | Cavender . |
| 4,955,675 | 9/1990 | Magester . |

FOREIGN PATENT DOCUMENTS

| | | |
|---|---|---|
| 1414320 | 11/1975 | United Kingdom . |
| 1592753 | 1/1981 | United Kingdom . |
| WO9113738 | 3/1990 | WIPO . |

*Primary Examiner*—Peter M. Cuomo
*Assistant Examiner*—Gerald A. Anderson
*Attorney, Agent, or Firm*—Paul and Paul

[57] ABSTRACT

A venting device for use in venting a hollow structure such as a refrigerator door to be filled with an expanding foamed-in-place insulation material has tapered apertures to allow gas to escape while retaining the insulation material. The venting device can include a chamber for receiving a hinge pin or a shelf end.

15 Claims, 2 Drawing Sheets

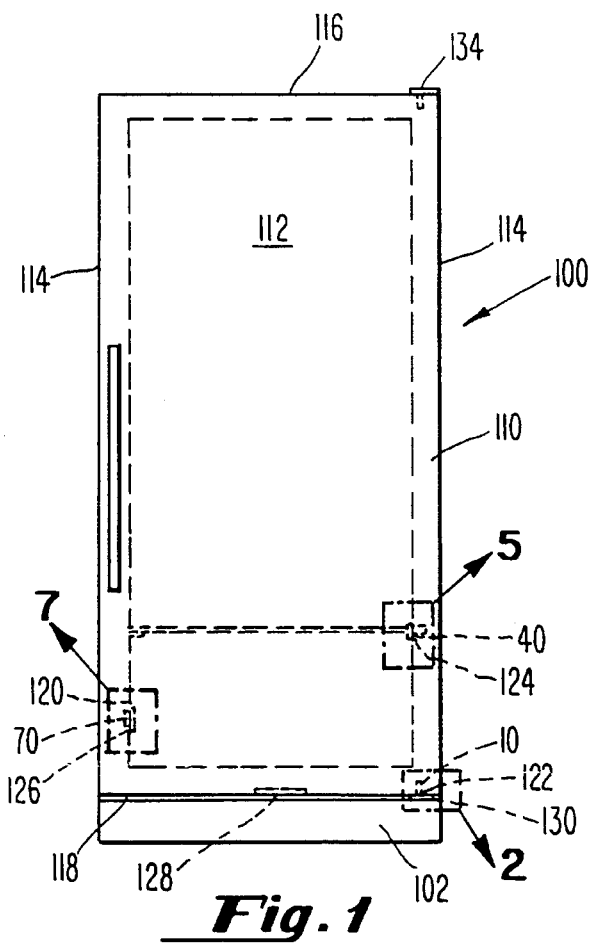
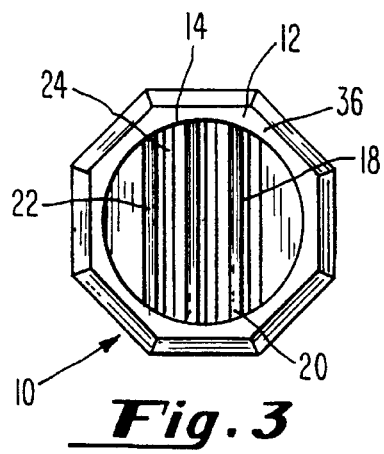
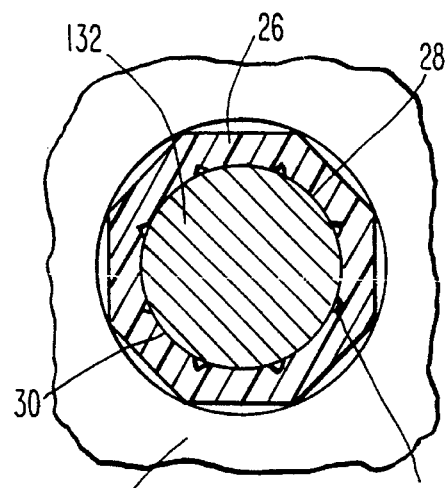
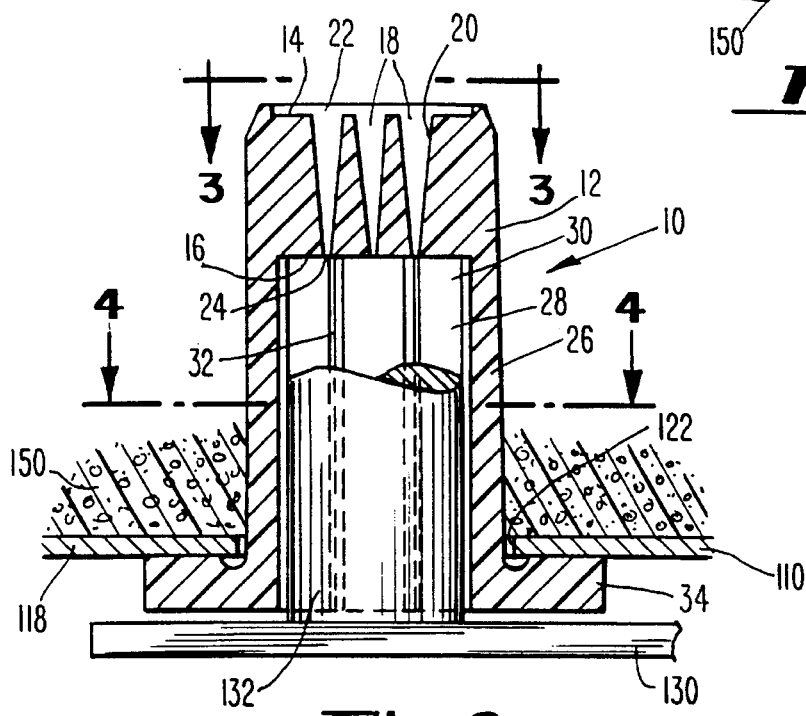

VENTING DEVICE

BACKGROUND OF THE INVENTION

1. Field of the Invention

The present invention relates to a venting device for use in a hollow structure such as a refrigerator door to be filled with foamed-in-place insulation.

2. Brief Description of the Prior Art

Insulated structures, such as refrigerators, freezers or the like incorporate insulation within their outer walls to prevent the exchange of heat between the internal enclosed compartment and the outside environment. In the past, it was the practice to provide the insulation by hand within the outer walls of the insulated structure. One problem associated with such manual application of insulation was that the process was time consuming and would result in a nonuniform distribution of insulation, producing a less efficient device.

Foamed-in-place insulation was developed to alleviate inadequacies in insulation application procedures. The foamed-in-place insulation is generated from a foamable liquid resin, such as a foamable polyurethane resin. The liquid resin is introduced within the outer walls of hollow structure to be insulated, and caused to foam. The foam is typically generated chemically or by use of a gaseous foaming or "blowing" agent.

It has been the practice in the art to provide the outer walls with holes, which are temporarily covered with either fiberglass or porous tape, to allow gases to escape while the foamable resin expands to fill the outer walls. The fiberglass or porous tape, however, does not adequately prevent the escape of foam. Usually, the fiberglass or porous tape is applied on the interior of the structure so that the tape cannot be removed after the foam has been installed. However, the tape must be later perforated and the apertures plugged. It is desirable to eliminate the escape of foam into the environment, and to eliminate the handling of fiberglass by employees.

One approach to solving this problem is disclosed in U.S. Pat. No. 4,955,675, which provides a venting device having small, round apertures formed in an end wall. The apertures permit gas from expanding insulation material to escape. However, the apertures are sized to retard passage of the semi-solid polymeric foam. In addition, the venting device may only be mounted adjacent a corner. The configuration of an insulated structure may be such that it would be necessary to provide a venting device in areas of an insulated structure other than, or in addition to the corners, in order to insure that all the gases will escape so that the foamed-in-place insulation may fill the structure.

SUMMARY OF THE INVENTION

The present invention provides an improved venting device for installation in the walls of hollow structures, such as for example, refrigerator doors and walls, truck bodies, and the like, which are to be filled with expanding foam (also known as "foamed-in-place") insulation material, such as a foamed-in-place polyurethane insulation. The venting device of the present invention advantageously allows gases such as air and the blowing agent from the expanding foam insulation to escape but prevents the passage of foam insulation itself. The venting device of the present invention comprises a body having an inner surface and an outer surface. The inner surface of the body is the surface oriented toward the interior of the hollow structure in which the venting device is to be installed. The body of the venting device has at least one aperture extending over a first area on the inner surface, through the body from the inner surface to the outer surface, and over a second area on the outer surface. The first area (on the inner surface) is greater than the second area (on the outer surface), and the aperture tapers inwardly from the inner surface to the outer surface. In a presently preferred embodiment, the at least one aperture comprises a generally elongated slot; preferably, a plurality of parallel slots are provided. In addition, the venting device preferably further comprising means for securing the venting device in an aperture in a wall in the hollow structure. For example, the venting device can be adapted to being snap-fit into a preformed aperture in the wall. While venting devices which serve only the function of venting gas are within the scope of the present invention, the present invention also contemplates venting devices which serve multiple functions. For example, the venting device can include a chamber for receiving a pin member, such as a hinge pin for mounting a refrigerator door on a refrigerator body, or for receiving a shelf end projection for securing a shelf within a refrigerator body.

While not wishing to be bound by an explanation of the function of the present invention, it is presently believed that the taper of the apertures in the venting device serves to force foam insulation to compress as it travels outwardly through the apertures, and that the force of compression opposes and balances the pressure driving movement of the foam into the aperture, thus preventing passage of the expanding foam material through the apertures and into the environment.

Advantageously, the present invention provides a venting device which can be permanently incorporated within the hollow wall of a structure. Unlike prior art attempts to solve the problem with fiberglass, the venting device does not require handling of fiberglass prior to installation of expanding foam insulation.

It is a further advantage that the venting device of the present invention is easy to manufacture, and at low cost, and which can be provided in a one-piece unit with no moving parts.

These and other features, objects and advantages will, in part, be pointed out with particularity and will become obvious from the more detailed description of the invention taken in conjunction with the accompanying drawings which form in integral parts thereof.

BRIEF DESCRIPTION OF THE DRAWINGS

FIG. 1 is a front elevational view of a refrigerator showing schematically the, positioning of several venting devices according to the present invention in the refrigerator.

FIG. 2 is sectional elevational view of a first venting device according to the present invention shown installed as a hinge bushing in the door of the refrigerator of FIG. 1.

FIG. 3 is a top plan view of the venting device of FIG. 2 taken along the line 3—3.

FIG. 4 is a sectional plan view of the venting device of FIG. 2 taken along the line 4—4.

DETAILED DESCRIPTION

Figure 5:
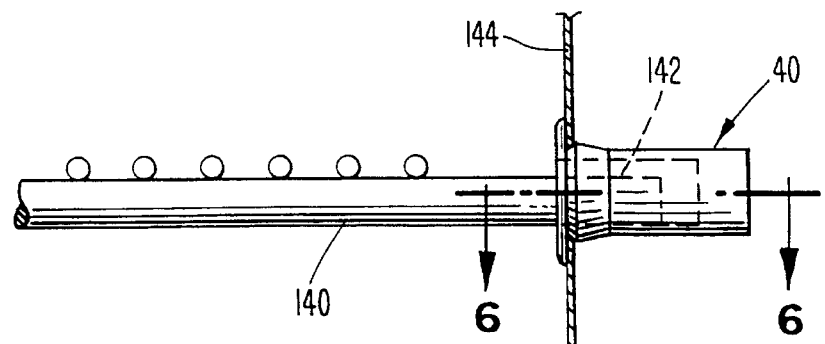
FIG. 5 is a side elevational view of a second venting device according to the present invention shown installed as a shelf end grommet in the refrigerator of FIG. 1.

Referring now to the drawings in detail, wherein like reference numerals indicate like elements throughout the several views, there is shown in the front elevational view of FIG. 1 a refrigerator 100 including an insulated door 110 to which the present invention has particular application. The refrigerator door 110 is formed in a conventional manner (not shown). Steel coil stock is formed to provide an outer door panel 112 and door side walls 114 and top and borrow walls 116, 118, to which is mechanically attached a preformed rigid plastic inner wall 120 thus providing a hollow structure having the general appearance of the finished refrigerator door 110. A plurality of apertures 122, 124, 126 are formed in the refrigerator door 110, including an aperture 128 in the bottom wall 118 through which expanding foam insulation is admitted during the manufacture of the door 110. Several of the apertures 122, 124,126 are fitted with venting devices 10, 40, 70 of the present invention to permit gas to escape from inside the hollow structure as it is being filled with expanding foam insulation to help prevent the occurrence of unfilled pockets of trapped air or gas within the refrigerator door, which could otherwise significantly reduce the insulative properties of the door 110.

While a refrigerator door 110 is illustrated in FIG. 1, the venting device of the present invention can be used in other applications for this purpose, such as in the walls of the refrigerator body, in walls of truck bodies being constructed for use as refrigerated trucks, in roof decks, in the walls of walk-in freezers, and the like, which are to be insulated by the installation of foamed-in-place insulation.

An enlarged sectional view of one of the venting devices 10 of FIG. 1 is shown in FIG. 2. This first presently preferred embodiment of the venting device of the present invention 10 also serves as a lower hinge bushing or bearing for mounting the refrigerator door 110 on a vertically projecting pin 132 of a lower hinge member 130 secured to the body 102 of the refrigerator 100. A corresponding upper hinge member 134 is shown in FIG. 1 and has a corresponding pin which is received by a respective venting device (not shown). An additional pair of hinge bushings can be provided at the other two corners of the refrigerator door 110 so that the door can mounted on either the right-hand or left-hand side of the refrigerator 100 (not shown).

The venting device 10 of FIG. 2 has a body 12 with an inner surface 14 oriented inwardly toward the interior of the refrigerator door 110 and a parallel outer surface 16 oriented toward the exterior of the refrigerator door 110. Extending through the body 12 from the inner surface 14 to the outer surface 16 are a plurality of tapered apertures 18 which each extend over a respective generally rectangular first area 22 of the inner surface 14 and a respective generally rectangular second area 24 of the outer surface 16. As best seen in the top plan view of FIG. 3, the apertures 18 are elongated slots formed in the body 12 and each having a pair of side walls 20. The side walls 20 taper uniformly from the inner surface 14 to the outer surface 16.

The first area 22 and the second area 24 of the tapered apertures 18 each have two characteristic dimensions, their lengths and widths. While varying slightly from aperture to aperture, the lengths of the first area 22 and the second area 24 of each aperture 18 are the same. However, the width of the first area 22 of each aperture 18 is the same and greater than the width of each second area 24.

The width of the second area 24 is about 0.010 inch and the width of the first area is about 0.065 inch. The apertures 18 extend for a length of 0.312 inch from the first area to the second area, the length being the thickness of the body 12. The apertures 18 have a taper of about (0.065 inch–0.010 inch)/0.312 inch or 0.055/0.312 or 0.18 to 1, that is the width of the aperture decreases by about 0.2 units per unit of thickness of the body 12. Preferably, the body has a thickness sufficiently great so that the apertures formed therein are long enough to prevent escape of foam-in-place insulation material. For example, in the presently described embodiment, it is preferred that the body has a thickness of at least about 0.3 inch.

While the interior of the refrigerator door 110 is being filled with expanding foam insulation, the apertures 18 permit gas to escape, while the taper of the apertures 18 is believed prevent the expanding foam insulation 150 from passing through the apertures 18, as described above. If the depth of the aperture is too small, it has been found that foam can escape through the aperture. For example, in one case an aperture having a first area with a width of 0.065 inch, a second area with a width of 0.010 inch, and a body thickness of 0.218 inch leaked foam. This aperture has a taper of 0.055/0.218 0.312 or 0.25 to 1.

Extending continuously from the body 12 of the venting device 10 is a generally cylindrical sleeve 26 having a concentric generally cylindrical interior chamber 28 for receiving the hinge pin 132. As best seen in the sectional plan view of FIG. 4 taken along the line 4—4 of FIG. 2, the interior chamber 28 has a generally circular cross-section divided into eight walls 30. As best seen in FIG. 2, each of the eight walls 30 of the interior chamber 28 is separated from each respective adjacent wall. 30 by a slot or groove 32 for lubricant if required. The venting device 10 is made such that the chamber 28 is sized to provide a running fit for the hinge pin 132, so that the hinge pin 132 is securely but rotatably engaged by the central surface of each of the eight walls 30 of the chamber 28, the grooves 32 permitting each wall 30 to be pressed elastically outward as the pin 132 is inserted.

The venting device 10 further includes a flat-headed flange 34 adapted to permit the venting device 10 to be seated squarely against bottom wall 118 of the refrigerator door 110 proximate the aperture 122 in which the venting device 10 is installed.

As best seen in FIGS. 2 and 3, the body 12 of the venting device 10 has an octagonal cross-section, and is slightly tapered proximate the end 36 thereof, to aid in inserting the venting device 10 in the aperture 122 in the refrigerator door 110.

An enlarged fragmentary elevational view of a second presently preferred venting device 40 according to the present invention is shown in FIG. 5. This embodiment of the venting device of the present invention 40 also serves as a grommet for receiving a shelf end projection 142 of a shelf 140 within a refrigerator door 110. A corresponding venting device 40 may be incorporated within the refrigerator door 110 in FIG. 1 (not shown) for receiving the opposing shelf end projection of the shelf 140.

Similarly, other pairs of venting devices of this second embodiment can be employed in securing shelves within other portions of the interior of the refrigerator 100, such as the freezer compartment and the main refrigeration compartment including the meat and vegetable storage areas, and especially in the wall separating the freezer and main refrigeration compartments in "side-by-side" refrigerators which is especially difficult to fill with foamed-in-place insulation (not shown).

Figure 6:
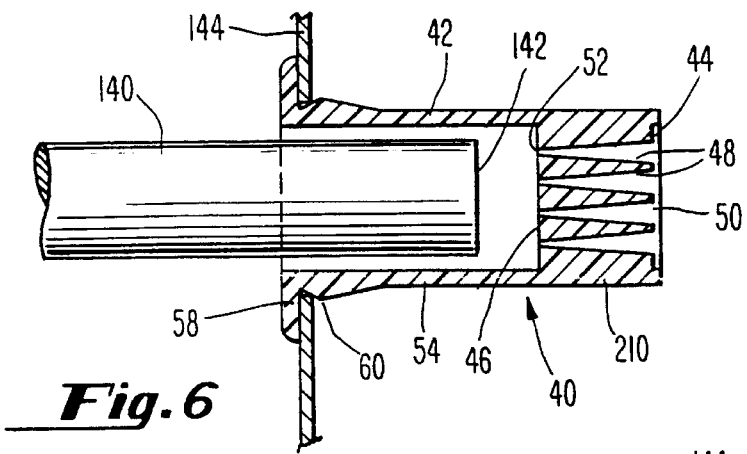
FIG. 6 is a side sectional view of the venting device of FIG. 5 taken along the line 6—6.

As best seen in the bottom sectional view of FIG. 6 taken along the line 6—6 of FIG. 5, the venting device 40 has a body 42 with an inner surface 44 and outer surface 46 corresponding to the inner and outer surfaces 14 and 16, respectively, of the first venting device 10. Similarly, a plurality of tapered apertures 48 extend through the body 42. Each of the tapered apertures 48 extends over a generally rectangular first area 50 of the inner surface 44 and a generally rectangular second area 52 of the outer surface 46. Extending continuously from the body 42 of the venting device 40 is a generally cylindrical sleeve 54 having a concentric cylindrical chamber 56 formed therein for receiving the shelf end projection 142. At the end of the sleeve 54 there is formed a flange 58 adapted to permit the venting device 40 to be seated squarely against inner wall 120 of the refrigerator door 110 proximate the aperture 124 in which the venting device 40 is installed. A ring-like projection 60 is formed on the outside of the sleeve 54 spaced from the flange 58 by the thickness of the refrigerator door wall 144, so that the venting device 40 can be snap-fit within the aperture 124.

Figure 8:
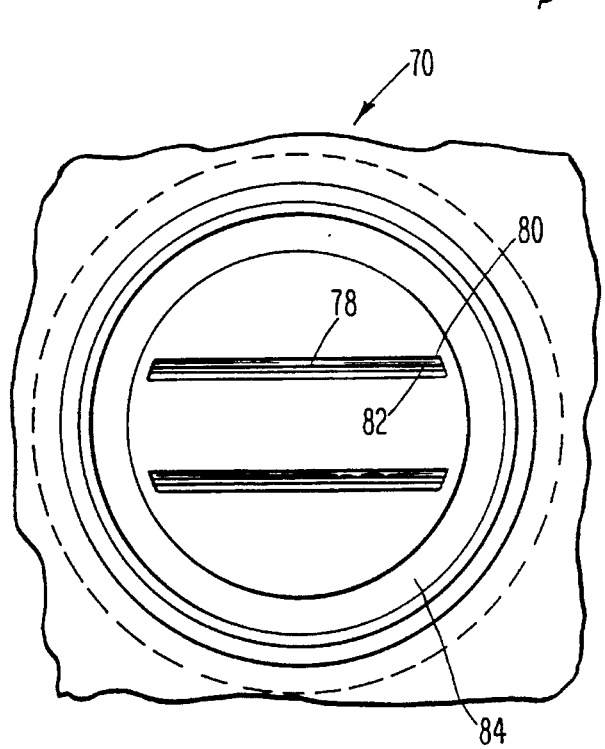
FIG. 8 is rear elevational view of the venting device of FIG. 7 taken along the line 7—7.
Figure 7:
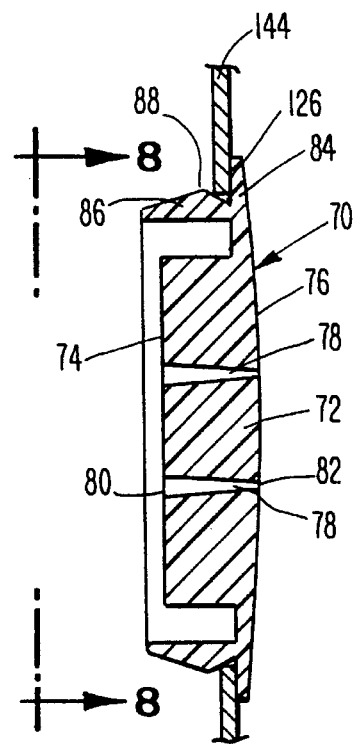
FIG. 7 is a side sectional view of a third venting device according to the present invention shown installed in the door of the refrigerator of FIG. 1.

An enlarged sectional view of a third presently preferred venting device 70 according to the present invention is shown in FIG. 7. The venting device 70 has a generally cylindrical body 72 with an inner surface 74 and outer surface 76. A plurality of tapered apertures 78 extend through the body 72. Each aperture 78 extends over a generally rectangular first area 80 on the inner surface 74 and a corresponding generally rectangular second area 82. As best seen in the rear elevational view of FIG. 8, the apertures 78 taper inwardly from the first surface 80 to the second surface 82. The third venting device 70 also includes an annular ring-like projection 84 extending continuously from the body 72 proximate the outer surface 76, the projection 84 being sized slightly larger than the aperture 126 in the refrigerator door wall 144 in which the third venting device 70 is to be installed. Extending perpendicularly from the rear of the projection 84 is an annular ring-like seating member 86, itself having a ring-like projection 88 on its outer surface so that third venting device 70 can be snap-fit within the aperture 126.

The venting device of the present invention can be produced by conventional techniques such as injection molding from thermoplastic or thermosetting materials, such as nylon, low density or medium density polyethylene or other polyolefins, engineering-grade resins, and the like. It should be understood, however, that the venting device can be made of any suitable material, without departing from the spirit of the invention.

It will be recognized by those skilled in the art that changes may be made to the above-described embodiments of the invention without departing from the broad inventive concepts thereof. It is understood, therefore, that this invention is not limited to the particular embodiments disclosed, but it is intended to cover all modifications which are within the scope and spirit of the invention as defined by the appended claims.

I claim:

1. A venting device for use in venting a hollow structure having at least one wall and adapted to be filled with an expanding foamed-in-place insulation material, the venting device comprising:

a body having an inner surface, the inner surface to be oriented toward the interior of the hollow structure, and an outer surface and at least one aperture extending over a first area on the inner surface, through the body from the inner surface to the outer surface, and over a second area on the outer surface, the first area being greater than the second area, the aperture tapering inwardly from the inner surface to the outer surface, the body having a thickness sufficiently great so that the apertures formed therein are long enough to prevent escape of foamed-in-place insulation.

2. A venting device according to claim 1, wherein the at least one aperture comprises a generally elongated slot.

3. A venting device according to claim 2 comprising a plurality of parallel apertures.

4. A venting device according to claim 1 further comprising means for securing the venting device in an aperture in a wall in the hollow structure.

5. A venting device according to claim 1 further comprising a chamber for receiving a pin member.

6. A venting device according to claim 5 wherein the chamber is adapted for receiving a hinge pin.

7. A venting device according to claim 5 wherein the chamber is adapted for receiving a shelf end.

8. A venting device according to claim 1 wherein the aperture tapers uniformly from the inner wall to the outer wall.

9. A venting device according to claim 8 wherein the aperture has a taper with a ratio of about 0.2:1.

10. A venting device according to claim 1 wherein the second area has at least one characteristic dimension, and at least one of the characteristic dimensions is no greater than about 0.2 mm.

11. A venting device according to claim 1 wherein the body has a thickness of at least about 0.3 inch.

12. A venting device according to claim 1 wherein foamed-in-place insulation has an average cell size, the second area has at least one characteristic dimension, and at least one of the characteristic dimensions is smaller than the average cell size of the foamed-in-place insulation.

13. A process for filling a hollow structure having at least one wall with foamed-in-place insulation, the process comprising a) forming at least one vent aperture in the at least one wall of the hollow structure;

b) installing a vent device in the at least one vent aperture, the vent device comprising:

a body having an inner surface, the inner surface to be oriented toward the interior of the hollow structure, and an outer surface and a plurality of elongated apertures, each aperture extending over a first area on the inner surface, through the body from the inner surface to the outer surface, and over a second area on the outer surface, the first area being greater than the second area, the aperture tapering inwardly from the inner surface to the outer surface, the body having a thickness sufficiently great so that the apertures formed therein are long enough to prevent escape of foamed-in-place insulation;

means for securing the venting device in an aperture in a wall in the hollow structure; and a chamber for receiving a pin member.

14. A venting device for use in venting a hollow structure having at least one wall and adapted to be filled with an expanding foamed-in-place insulation material, the venting device comprising:

a body having an inner surface, the inner surface to be oriented toward the interior of the hollow structure, and an outer surface and a plurality of elongated apertures, each aperture extending over a first area on the inner surface, through the body from the inner surface to the outer surface, and over a second area on the outer surface, the first area being greater than the second area, the aperture tapering inwardly from the inner surface to the outer surface the body having a thickness sufficiently great so that the apertures formed therein are long enough to prevent escape of foamed-in-place insulation;

means for securing the venting device in an aperture in a wall in the hollow structure; and a chamber for receiving a pin member.

15. A structure having at least one wall and filled with foamed-in-place insulation and comprising at least one venting device, the venting device comprising:

a body having an inner surface, the inner surface to be oriented toward the interior of the hollow structure, and an outer surface and a plurality of elongated apertures, each aperture extending over a first area on the inner surface, through the body from the inner surface to the outer surface, and over a second area on the outer surface, the first area being greater than the second area, the aperture tapering inwardly from the inner surface to the outer surface, the body having a thickness sufficiently great so that the apertures formed therein are long enough to prevent escape of foamed-in-place insulation;

means for securing the venting device in an aperture in a wall in the hollow structure; and a chamber for receiving a pin member.

* * * * *